(12) United States Patent
Boss et al.

(10) Patent No.: US 11,407,209 B2
(45) Date of Patent: Aug. 9, 2022

(54) PROTECTIVE PACKAGING MEMBRANES AS INTEGRATED LAYER IN BUILDING SYSTEM COMPONENTS

(71) Applicant: Building Materials Investment Corporation, Dallas, TX (US)

(72) Inventors: Daniel E. Boss, Morris Township, NJ (US); Isaac B. Rufus, Newark, DE (US); Wilson Cheung, Hillsborough, NJ (US); Adem Chich, Kearny, NJ (US)

(73) Assignee: BMIC LLC, Dallas, TX (US)

(*) Notice: Subject to any disclaimer, the term of this patent is extended or adjusted under 35 U.S.C. 154(b) by 0 days.

(21) Appl. No.: 17/341,529

(22) Filed: Jun. 8, 2021

(65) Prior Publication Data

US 2021/0379876 A1 Dec. 9, 2021

Related U.S. Application Data

(60) Provisional application No. 63/036,261, filed on Jun. 8, 2020.

(51) Int. Cl.
*B32B 27/12* (2006.01)
*B32B 27/32* (2006.01)
(Continued)

(52) U.S. Cl.
CPC .............. *B32B 27/12* (2013.01); *B32B 5/022* (2013.01); *B32B 5/024* (2013.01); *B32B 5/18* (2013.01);
(Continued)

(58) Field of Classification Search
CPC .............. Y10T 428/19; B29K 2711/14; B29K 2715/006; B29K 2995/0087;
(Continued)

(56) References Cited

U.S. PATENT DOCUMENTS

| 4,021,981 A | 5/1977 | Van Wagoner |
| 4,464,215 A | 8/1984 | Coglino |

(Continued)

FOREIGN PATENT DOCUMENTS

WO WO2018/023147 A1 2/2018

OTHER PUBLICATIONS

The International Search Report and the Written Opinion of the International Search Authority dated Sep. 16, 2021.
(Continued)

*Primary Examiner* — Camie S Thompson
(74) *Attorney, Agent, or Firm* — Womble Bond Dickinson (US) LLP

(57) ABSTRACT

Building materials such as structural panels, beams, roof decking, and flooring panels, are packaged within a protective layer including a sublayer of a polymeric material that can be applied at the factory. The protective layer protects the underlying building materials from exposure to weather and potential damage due to handling during shipping, at a job site, and which can be left in place during construction, thus eliminating the need for temporary protective measures covering the building materials. The protective layer may have additional properties such as breathability, fire resistance, and sound absorption. The protective layer also may provide an underlayment such as for flooring and roofing.

21 Claims, 9 Drawing Sheets

(51) Int. Cl.
*B32B 21/08* (2006.01)
*B32B 27/30* (2006.01)
*B32B 27/36* (2006.01)
*B32B 17/02* (2006.01)
*B32B 5/18* (2006.01)
*B32B 13/12* (2006.01)
*B32B 5/02* (2006.01)
*E04D 3/35* (2006.01)
*E04F 15/10* (2006.01)
*E04C 2/24* (2006.01)
*B32B 7/12* (2006.01)

(52) U.S. Cl.
CPC ............... *B32B 7/12* (2013.01); *B32B 13/12* (2013.01); *B32B 17/02* (2013.01); *B32B 21/08* (2013.01); *B32B 27/308* (2013.01); *B32B 27/32* (2013.01); *B32B 27/36* (2013.01); *E04C 2/24* (2013.01); *E04D 3/35* (2013.01); *E04F 15/107* (2013.01); *B32B 2255/10* (2013.01); *B32B 2307/102* (2013.01); *B32B 2307/304* (2013.01); *B32B 2307/3065* (2013.01); *B32B 2307/558* (2013.01); *B32B 2307/71* (2013.01); *B32B 2307/724* (2013.01); *B32B 2307/7265* (2013.01); *B32B 2419/06* (2013.01); *B32B 2471/00* (2013.01)

(58) Field of Classification Search
CPC ............... B29C 45/14811; B29C 70/76; B29C 2045/14909; C08J 2300/22; C08J 7/043; C08J 7/05; C08J 2423/12; E04C 2/24; E04D 3/35; E04F 15/107; B32B 2037/1215; B32B 2255/10; B32B 2255/20; B32B 2255/26; B32B 5/08; B32B 5/24; B32B 5/022; B32B 25/08; B32B 27/12; B32B 27/28; B32B 27/32; B32B 27/36; B32B 27/308; B32B 37/12; B32B 7/04; B32B 7/12; B32B 17/04; B32B 17/064; B32B 17/02; B32B 2264/0257; B32B 2307/102; B32B 2307/304; B32B 2307/3065; B32B 2307/558; B32B 2307/71; B32B 2307/724; B32B 21/08

USPC ................................... 428/57; 264/255
See application file for complete search history.

(56) References Cited

U.S. PATENT DOCUMENTS

| | | |
|---|---|---|
| 4,775,567 A | 10/1988 | Harkness |
| 6,689,451 B1 | 2/2004 | Peng et al. |
| 7,984,591 B2 | 7/2011 | Cashin et al. |
| 8,158,450 B1 | 4/2012 | Sheats et al. |
| 8,215,083 B2 | 7/2012 | Toas et al. |
| 8,323,770 B2 | 12/2012 | Mehta et al. |
| 8,590,267 B2 | 11/2013 | Jaffee |
| 9,611,647 B2 | 4/2017 | Yang |
| 9,636,892 B2 | 5/2017 | Albert et al. |
| 9,783,995 B2 | 10/2017 | Meersseman et al. |
| 10,240,338 B2 | 3/2019 | Durst et al. |
| 10,259,199 B2 | 4/2019 | Beuchel et al. |
| 10,415,245 B2 | 9/2019 | Bennett et al. |
| 10,787,832 B2 | 9/2020 | Blomgren et al. |
| 10,975,562 B2 | 4/2021 | Griechen et al. |
| 2004/0209032 A1* | 10/2004 | Wani .................. B29C 45/0046 428/57 |
| 2005/0170720 A1 | 8/2005 | Christiansen et al. |
| 2007/0193167 A1 | 8/2007 | Bruce et al. |
| 2008/0029210 A1 | 2/2008 | Swei et al. |
| 2011/0185651 A1 | 8/2011 | Taylor |
| 2011/0197543 A1 | 8/2011 | Lee et al. |
| 2018/0015688 A1 | 1/2018 | Park et al. |
| 2018/0363317 A1 | 12/2018 | Blomgren |
| 2019/0126508 A1 | 5/2019 | Morf |
| 2020/0040582 A1 | 2/2020 | Boss et al. |
| 2020/0149276 A1 | 5/2020 | Mathey et al. |
| 2020/0149288 A1 | 5/2020 | Griechen et al. |
| 2020/0265172 A1 | 8/2020 | Martin et al. |
| 2021/0078047 A1 | 3/2021 | Olson et al. |
| 2021/0095479 A1 | 4/2021 | Schneider et al. |

OTHER PUBLICATIONS

Katerra; Light Timber Structural Components-Brochure; katerra. com; available as of the filing date of the present application.
Katerra; Katerra CLT Product Definition; Technical Specifications Booklet; clt@katerra.com/katerra.com/ctl; updated May 2021.
Katerra: Building Platforms-Brochure; 2019.

* cited by examiner

PROTECTIVE PACKAGING MEMBRANES AS INTEGRATED LAYER IN BUILDING SYSTEM COMPONENTS

REFERENCE TO RELATED APPLICATIONS

The present Patent Application claims the benefit of U.S. Provisional Patent Application No. 63/036,261, filed Jun. 8, 2020.

INCORPORATION BY REFERENCE

The disclosure of U.S. Provisional Patent Application No. 63/036,261, filed Jun. 8, 2020, is specifically incorporated by reference herein as if set forth in its entirety.

TECHNICAL FIELD

This disclosure relates generally to building materials and more specifically to integrated protective packaging, sheathing, or membranes for building materials.

BACKGROUND

Current construction practices often employ temporary covering or sheathing solutions for protecting building systems components such as structural beams, decks, and panels from weather during transport and prior to installation. Such temporary solutions can, however, be ineffective at providing substantially complete weather protection, and generally are removed prior to installation of the building systems components, creating waste materials. It is to the elimination of such temporary solutions that the present invention is primarily directed.

SUMMARY

Building materials such as structural panels, beams, flooring materials, roofing materials including decking, and other construction components are clad or laminated with a protective layer that can comprise a membrane or film materials applied at a factory. For example, a protective layer including a polymeric sublayer, such as a membrane or film material, can be adhesively attached, bonded, laminated or otherwise incorporated with the building material, such as roof decking panels, structural supports or beams, exterior and/or interior wall panels, and/or flooring, to form a package. The protective layer is configured to be left in place covering the building materials during transport and installation of the building materials at a job site as part of a building structure; and thus can eliminate the need for temporary weather protection of such building system components at a job site and can provide protection for building system components against damage due to transport, handling, and installation abuse. The protective layer can also become an integrated or permanent part of a building into which they are incorporated.

Further, in embodiments, the protective layer can include a plurality of sublayers, such as water resistant layers, weatherproof layers, adhesive layers, reinforcement layers, breathable layers, scrim layers, non-woven layers, thermoplastic polyolefin (TPO) layers, polyethylene (PE) layers, and/or some combination thereof. Adhesive materials, including pressure-sensitive or self-sealing adhesive materials further will be applied between the one or more polymeric sublayers of the protective layer and the building material covered thereby, and between the sublayers of the protective layer for attaching such sublayers together to form the protective layer and overall package. Different combinations of sublayers may be utilized for different applications, e.g., particular combinations of layers may be used as a vapor barrier, protective barrier, breathable fire barrier, a tile or cement backer, or for other purposes as described herein.

Aspects of the present disclosure can include, without limitation, a package comprising a plurality of building materials; wherein each of the building materials comprises a core of a laminate or extrudate, the core having a first surface and a second surface; and a plurality of protective layers, wherein each of the protective layers comprises a polymeric sublayer and an adhesive sublayer; wherein the adhesive sublayer of at least one of the plurality of protective layers is in contact with the first surface of the core of each of the plurality of building materials; wherein a peel strength of the protective layer on the core is 1 lb/in to 12 lb/in when tested according to ASTM D903; and wherein, the protective layer is configured to remain in place after the building material is installed in a building structure.

In embodiments, of the package, at least some of the building materials comprise a roofing panel. In some embodiments, the polymeric sublayer comprises a thermoplastic polyolefin membrane.

In embodiments, at least some of the building materials comprise a flooring panel, and wherein the polymeric sublayer comprises a thermoplastic polyolefin membrane. In some embodiments, the floor panel comprises a pre-fabricated laminate wood, a cross-laminated timber, or combination thereof.

In other embodiments of the package, at least some of the building materials comprise tile or cement backing panels. In still other embodiments, the building materials comprises structural supports, and wherein the protective layer further comprises a vapor permeable film.

In embodiments, the polymeric sublayer comprises a film configured to encapsulate the core of the building material, and having at least one overlap portion that projects past at least one side edge of the core. In some embodiments, the polymeric sublayer comprises a polyolefin, acrylic, thermoplastic, elastomer, polyester, fiberglass, cellular foam, aerogel foam, foil, or combination thereof.

In embodiments, the polymeric sublayer comprises a film material having at least one property selected from the group comprising fire resistance, insulation, impact resistance, breathability, ultraviolet resistance, water resistance, sound dampening, or combinations thereof. In embodiments, the building material comprises a tile or cement backing panel. In some embodiments, the building material comprises a structural support, and the protective layer further comprises a vapor permeable film material.

In embodiments, a package is provided, comprising at least one building material including a core having a plurality of side edges, a first surface, and a second surface; and a plurality of protective layers, each of the protective layers comprising a polymeric sublayer and an adhesive sublayer; wherein adhesive sublayer of each of the plurality of protective layers is in contact with the first surface of the core. The protective layer further is configured to remain in place after installation of the building material in a building structure and the protective layer, wherein a peel strength of the protective layer on the core is 1 lb/in to 12 lb/in when tested according to ASTM D903.

In embodiments, the protective layer, when tested using ASTM E96, ASTM C473, ASTM C423-17, ASTM E283, ASTM E84, ASTM E84-13, ASTM E84-162, ASTM D570, ASTM D1435-20, and/or other ASTM testing, exhibits one or more of fire resistance, insulation, impact resistance, breathability, ultraviolet resistance, water resistance, sound dampening, or combinations thereof. In some embodiments, the protective layer exhibits a durability and resistance to outdoor weathering that meets or exceeds the standards for outdoor weathering of plastics when tested using ASTM D1435-20. In some embodiments, the protective layer will continue to exhibit and maintain waterproof characteristics in the case of an impact thereagainst, as tested according to UL 2218.

In embodiments, the building material comprises a roof deck panel. In another embodiment of the building material, the building material comprises a flooring panel. In such an embodiment, the polymeric sublayer of the protective layer may comprise a thermoplastic polyolefin or an elastomeric underlayment membrane. In some embodiments, the core of the floor panel may comprise a flooring substrate or backing panel formed from a pre-fabricated laminate wood, a cross-laminated timber, or a cementations material.

In an embodiment, the protective layer comprises a waterproof polymeric membrane. In embodiments, the waterproof polymeric membrane comprises a film covering and encapsulating the polymeric layer and core of the building material with at least one overlap portion that projects over and past at least one side edge of the building material.

In embodiments, the protective layer comprises a membrane or film formed from polyolefin, acrylic, thermoplastic, elastomer, polyester, fiberglass, cellular foam, aerogel foam, or foil. In other embodiments of the building material, the protective layer comprises a breathable membrane or film having fire resistance, insulating, impact resistance, breathability, ultraviolet resistance, walkability, sealing, water resistance, sound dampening properties, or some combination thereof.

In an embodiment of the building material, the building material comprises a tile or cement backing panel. In another embodiment, the building material comprises a wood sheathing panel or structural support. In such embodiments, the protective layer may further comprise a breathable foil or adhesive attached membrane that is vapor permeable and has water resistance and sound dampening properties.

Other aspects of the packages of the present disclosure include a multi-layer factory assembled building material. The building material comprises a core comprising an extrudate or laminate having a series of side edges, a first surface, and a second surface; a protective layer applied over the upper surface of the core, the protective layer comprising at least one polymeric sublayer and at least one adhesive layer, wherein the at least one polymeric sublayer comprises a thermoplastic polymer membrane or a fibrous woven or non-woven scrim material, and wherein the at least one adhesive layer is applied along the first surface of the core; and an adhesive applied along the lower surface of the core and adapted to substantially bond the core to an underlying substrate, with a removable release layer applied thereover to protect the adhesive prior to installation; and wherein the protective layer applied over the core comprises a weatherable film substantially encapsulating the core during assembly of the building material at a factory, and is configured to remain in place covering the core during and after installation of the building material at a job site; the protective layer forming an integrated water and weather resistant covering to protect the building material during transport and after installation of the building material as part of a building structure.

In embodiments, the building material comprises at least one of a roof deck panel, flooring panel, wall panel, and a structural support or beam. In embodiments, the core of the building material comprises a cross-laminated timber material, a laminated wood material, an extruded polymeric material, or a cement based material.

In an embodiment, the at least one polymeric sublayer of the protective layer comprises a waterproof polymeric membrane. In such embodiments, the waterproof polymeric membrane comprises a film applied over the core with at least one overlap portion that extends past at least one side edge of the core. In another embodiment, the at least one polymeric sublayer of the protective layer comprises a breathable membrane with sound dampening properties.

In other embodiments, the building material comprises a wood sheathing panel or structural support; and the protective layer comprises a breathable foil or adhesive attached membrane. The breathable foil or adhesive may be vapor permeable and may have water resistance and sound dampening properties.

In yet another embodiment, the protective layer comprises a membrane or film formed from polyolefin, acrylic, thermoplastic, elastomer, polyester, fiberglass, cellular foam, aerogel foam, or foil. In some embodiments, the protective layer further comprises a fire resistant coating, a breathable fire barrier, a sound damping coating, or a smart coating of a phase change or adaptive vapor control material.

In embodiments, the building material comprises a flooring substrate for wood, laminate, tile, cement, or carpet, and wherein the protective layer comprises a vapor permeable underlayment.

In other aspects, of the present disclosure, a roofing system comprises a substrate; a plurality of building materials positioned on the substrate; wherein each of the plurality of building materials comprises a core comprising a laminate or extrudate and having a first surface and a second surface; and a plurality of protective layers; wherein each of the plurality of protective layers comprises a polymeric sublayer; and an adhesive sublayer; wherein the adhesive sublayer of each of the plurality of protective layers is in contact with the first surface of the core of each of the plurality of building materials; wherein a peel strength of each of the plurality of protective layers on the core of each of the plurality of building materials is 1 lb/in to 12 lb/in when tested according to ASTM D903; and wherein each of the plurality of protective layers is configured to remain in place after each of the plurality of building materials are installed on the substrate to form a roof.

In embodiments of the roofing system, each of the plurality of protective layers further comprises a plurality of polymeric sublayers, each of the plurality of polymeric sublayers having at least one property selected from the group comprising fire resistance, insulation, impact resistance, breathability, ultraviolet resistance, water resistance, sound dampening, or combinations thereof.

In embodiments of the roofing system, each of the plurality of protective layers further comprises a fire resistant coating, a sound damping coating, a smart coating of an adaptive vapor control material, or combination thereof.

Accordingly, embodiments of building materials and methods for forming the building materials that are directed to the above discussed and other needs are disclosed. The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Reference will now be made in more detail to the attached drawing figures. In embodiments, a package including a building material, such as a beam, flooring material, roofing material, wall, or other construction component, and with a protective layer configured to protect the building material from external elements and/or forces, is illustrated. For example, during shipment of building materials, the building materials may be exposed to weather (e.g., wind, rain, snow, heat, ultraviolet (UV) light, etc.) or may experience external forces from handling prior to, during, and/or after shipping. Further, after shipment, the building materials may continue to be exposed to the elements and to potential damage from handling prior to, during, and after installation. As such, the building materials are packaged with a protective layer. The protective layer is configured to protect the building material from environmental and other forces or elements and, rather than creating waste, may be left on the building materials, offering further protections, e.g., such as weather proofing and/or fire resistance, as well as other benefits described herein.

FIGS. 1A-6 illustrate non-limiting example embodiments of a package for building materials including a plurality of building materials packaged within protective layers. The building materials each generally will include a core and will be encapsulated within a protective layer, which can have multiple sublayers, including at least one polymeric sublayer and at least one adhesive layer, and is configured to be left in place, protecting the building material during and after installation of the building material at a job site. The protective layer, in various non-limiting embodiments, further can be configured with one or more selected protective characteristics or properties, according to principles of the present disclosure.

Various non-limiting embodiments of packages 100 and 107 are illustrated in FIGS. 1A-1G; while FIGS. 2-6 illustrate additional example configuration of packages 200, 300, 400, 500 and 600, including packages with multi-sublayer protective layers. A plurality of the building materials 102 may be included in each package, with the plurality of building materials each having a protective layer in contract therewith. Thus, while the Figures illustrate packages with a core of a building material encapsulated within a protective layer, it will be understood that such packages, in various embodiments, will include a plurality of building materials and a plurality of protective layers applied to the plurality of building materials, the protective layers configured to remain in place with the building materials after the building materials are installed in a building structure. The packaged building materials 102 may be utilized for various applications in a building structure (e.g., roofing, flooring, walls, and/or structural supports).

Figure 1A:
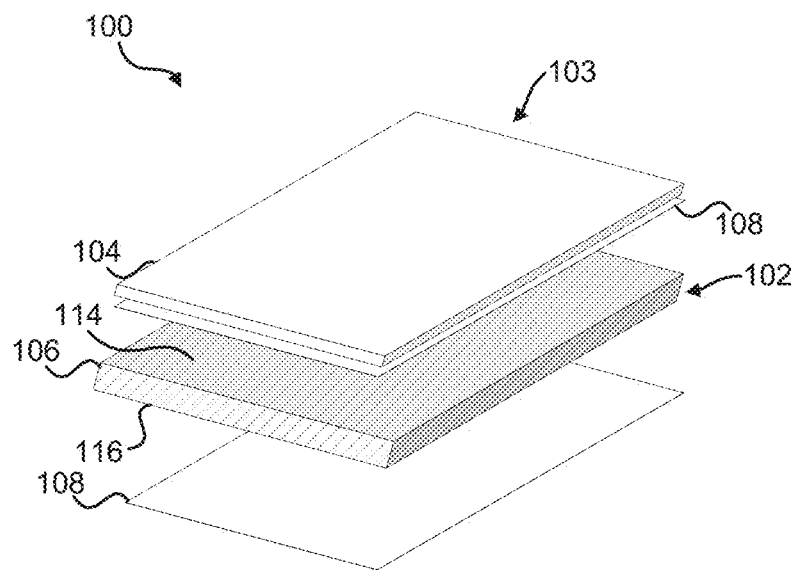
FIG. 1A is an isometric exploded view of one example embodiment of a package including a building material covered by a protective layer according to principles of the present disclosure.
Figure 1B:
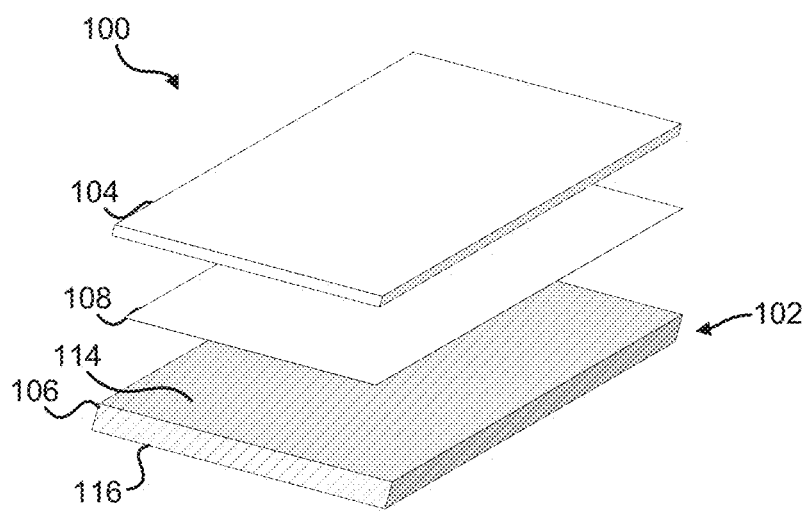
FIG. 1B is an isometric exploded view of another example embodiment of a package including a building material covered by a protective layer according to principles of the present disclosure.

Referring first to FIG. 1A and FIG. 1B, package 100 is illustrated as comprising a building material 102 and a protective sublayer 103 that comprises at least one or more sublayers. The building material 102 will include a core 106 that can include a laminate having multiple stacked layers, or an extrudate, and in some embodiments, can further include solid wood, cement or other, similar materials. The protective layer 103 will include at least one polymeric sublayer 104 and/or at least one adhesive sublayer 108 applied to a first surface of the core 106 or to the polymeric sublayer 104 for attaching the sublayer 104 to the core. It also will be understood that while the protective layer of the package, including its sublayers, is shown along a first surface of the core for clarity of illustration, the protective layer will extend about and cover the first and second surfaces and side edges of the core of the building material to form an encapsulated building material package 100, 107.

In embodiments, the adhesive sublayer 108 also may be applied to a second surface 116 of the core 106 as illustrated in FIG. 1A. The adhesive sublayer 108, in such embodiments, may be configured to attach the package 100 to a substrate for installation as part of a building structure. Further, the adhesive sublayer 108 will be covered or protected by the polymeric sublayer 104. In another embodiment, an additional polymeric sublayer, which can include a film comprised of the same material as the polymeric sublayer 104, or a different material, e.g. a substantially water resistant film (which is configured to deter passage of water therethrough), while the additional film sublayer can include a vapor permeable material.

In another embodiment, the adhesive sublayer 108 may be applied or incorporated with the polymeric sublayer 104 to attach the polymeric sublayer 104 to the core 106 as illustrated in FIG. 1B. In such embodiments, the adhesive sublayer 108 may be applied to at least the first surface 114 of the core 106. In other embodiments, the polymeric sublayer 104 may exhibit adhesiveness on at least one side. In other words, one side of the polymeric sublayer 104 may include an integrated adhesive sublayer 108 or coating adapted to enable adhesion of the polymeric sublayer to the core 106 or to another polymeric sublayer. In such embodiments, the other side of the polymeric sublayer 104 may also include coating, including, but not limited to, silicon or thermoplastic polyolefin (TPO), a textured surface.

In an embodiment, the protective layer 103 may exhibit various properties, such as fire resistance, insulation, impact resistance, breathability, ultraviolet resistance, water resistance, water vapor transmission resistance, sound dampening, durability, ability to resist outdoor weathering, or combinations thereof, which can be selected based on designed use or environmental conditions to which the building material will be subjected. Such properties may be determined via ASTM D903, ASTM D1876, ASTM E96, ASTM D570, ASTM C473, ASTM C423-17, ASTM E283, ASTM E84, ASTM E84-13, ASTM E84-162, ASTM D1435-20, and/or other ASTM testing. Other standard tests (e.g., including, but not limited to, ISO or UL testing), may be utilized to determine the various properties of the protective layer.

Figure 1C:
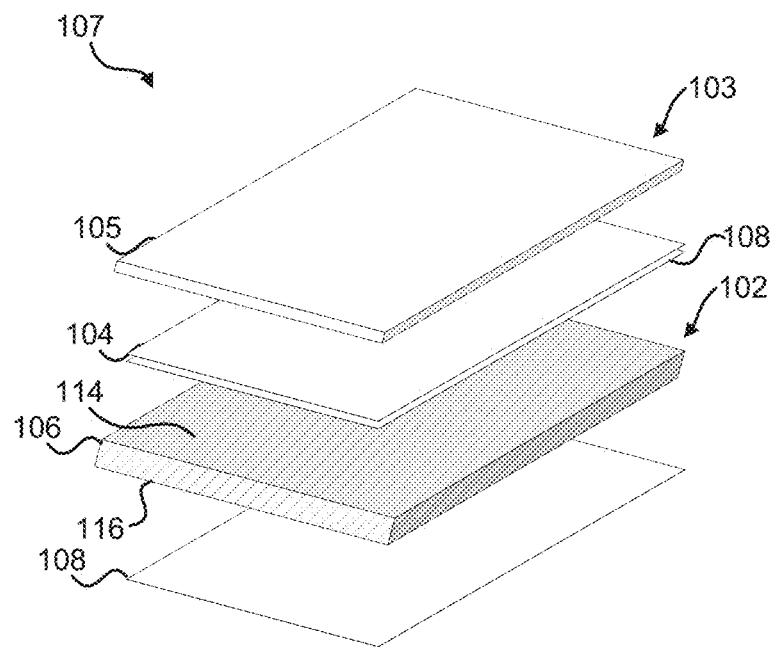
FIG. 1C is an isometric exploded view of another example embodiment of a package including a building material covered by a protective layer according to principles of the present disclosure.
Figure 1D:
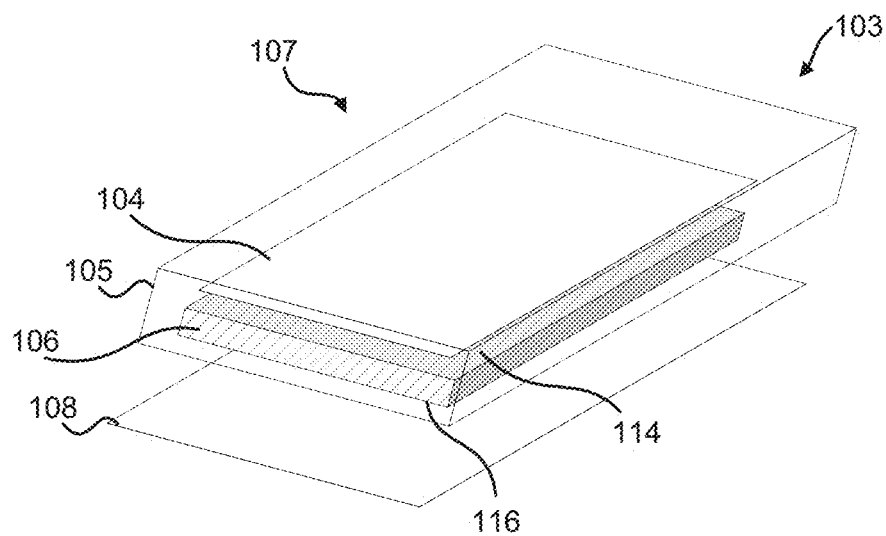
FIG. 1D is an isometric exploded view of another example embodiment of a package including a building material covered by a protective layer according to principles of the present disclosure.
Figure 1E:
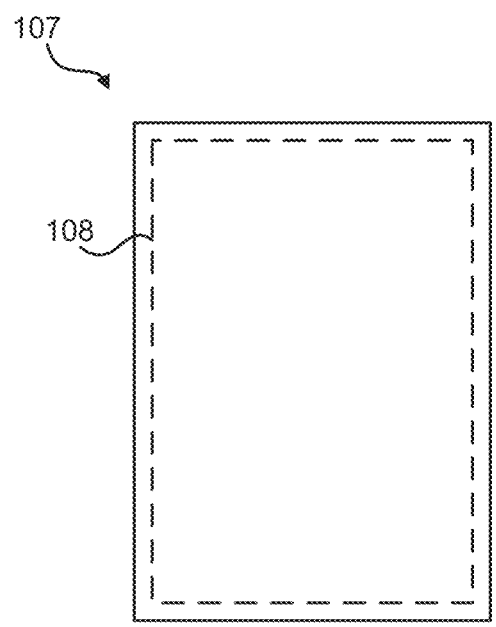
FIG. 1E is a top down view of one example embodiment of a package including a building material covered by a protective layer such as shown in FIGS. 1A-1E according to principles of the present disclosure
Figure 1F:
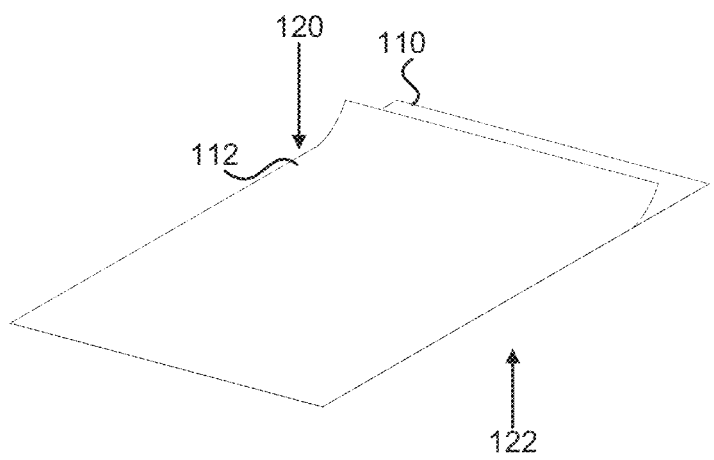
FIG. 1F is an isometric view of one example embodiment of an adhesive sublayer of a protective layer including a partially released release film according to principles of the present disclosure.
Figure 1G:
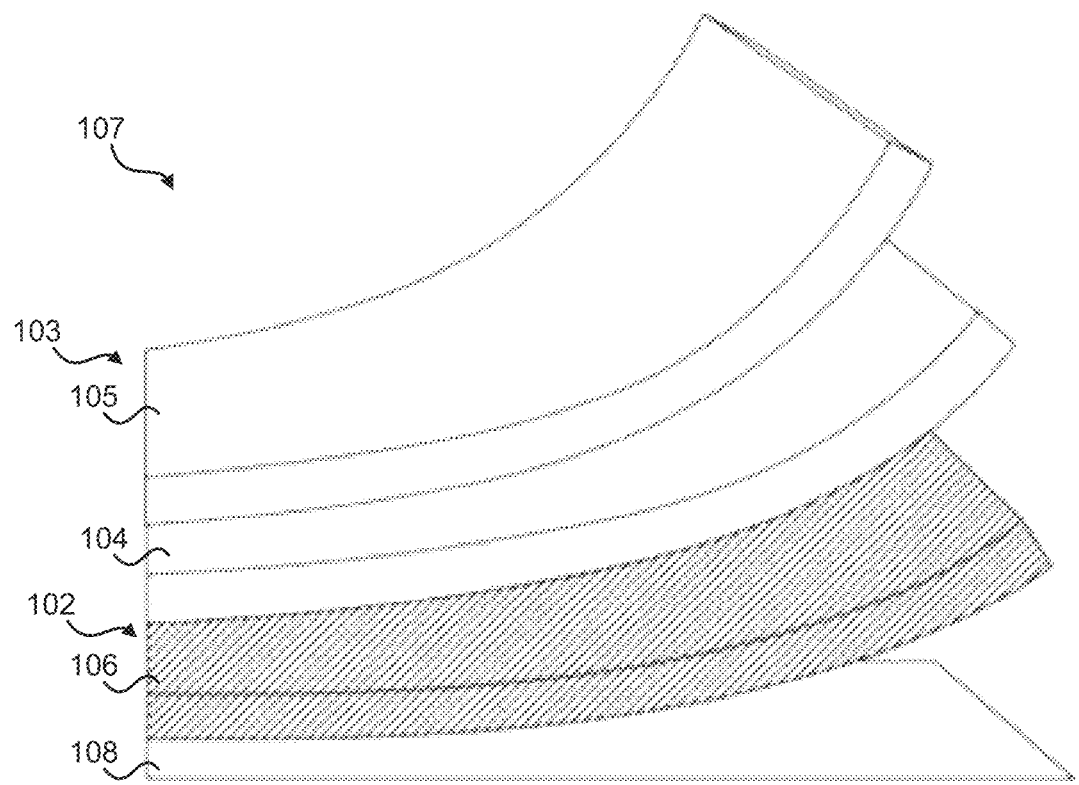
FIG. 1G is an elevational exploded view of one example embodiment of a package including a building material covered by a protective layer according to principles of the present disclosure.

Referring to FIGS. 1C, 1D, and 1G, a package 107 is illustrated as including a protective layer 103 having multiple sublayers such as 104 and 105, though it will be understood that the package 107, and any of the packages 100 shown in FIGS. 1A and 1B, can include greater or fewer sublayers. The sublayers include a first, outer sublayer 105 comprising a barrier layer, and a second, polymeric sublayer 104 covering the core 106 of the building material, and an adhesive sublayer 108. The first sublayer 105, the second sublayer 104, and the adhesive sublayer 108 can be applied to the core and/or to another sublayer in a particular order, depending on the application. For example, the first sublayer 105 can be applied to the second sublayer 104, and the second sublayer 104 can be applied to the first surface 114 and second surface 116 of the core 106, with the adhesive sublayer 108 applied between the polymeric sublayer and the first and second surfaces of the core 106. The sublayers also can be attached together to form the protective layer 103, by bonding, adhesives, heating, or can be otherwise attached to one another. As noted, other sublayers also can be applied in varying orders based on the application or end-use of the building material or, in other words, where and/or how the building material is utilized.

In an embodiment, applying one sublayer to another can refer to adhesively attaching one sublayer to another sublayer. In another embodiment, one or more sublayers each can be attached to another sublayer, alone or in addition to an adhesive, by bonding or thermal attachment; and in some embodiments can be attached via fasteners or via other mechanical connections, such as rivets, snaps, and/or press-fit type connections. One or more sublayers can be applied to another sublayer as a coating. One or more of the sublayers also can be applied to one another as a co-extrusion, e.g., a sublayer is applied to another sublayer via an extruder, or can be laminated with another sublayer.

In embodiments, the protective layer 103 and/or one or more polymeric sublayers 104 thereof, can be applied to the core 106 as a tape material (e.g. a self-wound polymeric material that can be rolled out over the core 106 of the building material). In embodiments, the tape material can also include an adhesive material along one side surface thereof, and in further embodiments, a release agent such as a silicone coating, release strip or other, similar material, or use of textured surface can be used to deter adhesion of the adhesive to the other side surface of the tape when in a self-wound condition. In such embodiments, the protective layer 103 may be applied to the core 106 at a factory or prior to shipment from a factory or other storage site. In some embodiments, a protective layer 103 can be applied to the core 106 of each of a plurality of building materials in the field, and will remain with the building materials during and after installation of the building materials. In an embodiment, one or more of the different methods to combine and/or attach the protective layer to the core and to attach one or more sublayers of the protective layer to each other and to the core may be utilized (e.g., coatings and extrusion, coating and lamination, adhesion, extrusion, thermal bonding, welding, and mechanical connections, or some combination thereof).

In an embodiment, the first sublayer 105 can comprises an outer barrier material, and can be separate from or incorporated with the second sublayer 104, and/or a combination of both to form the protective layer 103 that will adhere to and encapsulate the building material 102.

In embodiments, the protective layer, and any of the sublayers thereof, can comprise a film or thin film, for example, a breathable membrane, breathable film, waterproof polymeric membrane, or a protective coating. In such examples, the protective layer also may include other sublayers (e.g., the protective layer will include a first sublayer 105, second sublayer 104, the adhesive sublayer, and other sublayers, or some combination thereof such as illustrated in FIGS. 2-6 and discussed further below). The protective layer 103 also can include functional properties or characteristics such as fire resistance (e.g., the protective layer 103 able to withstand or prevent the spread of fire, as tested according to ASTM E119 and/or ASTM E108), insulation, impact resistance, breathable, weatherable or resistance to ultraviolet light (including, but not limited to, an UV/AO polyolefin coating or weatherable TPO films or sheets), and/or infrared reflectance. In some embodiments, the protective layer 103 exhibits substantially no cracks or loss of breaking or tearing strength over a period of time of 300 hours or more when exposed to UV light, according to ASTM G154 and/or ASTM G155. The protective layer 103 also can be configured to allow for a person to walk on the building material 102 without damage thereto. In some embodiments, the protective layer can continue to exhibit and maintain waterproof characteristics after impacts thereagainst, such as from hail or other objects, as tested according to UL 2218.

The protective layer 103 also can be configured to promote sealing (e.g., sealing about a nail or other fastener utilized to install the building material 102, whereby the protective layer 103, or at least one sublayer thereof, is configured to close about and create a seal around the opening created by insertion of the nail therethrough). In embodiments, the protective layer 103 will also provide water resistance (e.g., resistance to the passage of water flow therethrough) and water shedding properties (e.g. facilitating flowing of water away from the building material to deter pooling or ponding of water along the building materials), and/or sound dampening properties. In such embodiments, the protective layer 103 may be configured to have a low perm. In some embodiments, the protective layer 103 can have approximately 1 perm to approximately 20 perm, as tested according to ASTM E96; and in embodiments, can have 1 perm to 2 perm, 1 perm to 2 perm, 1 perm to 3 perm, 1 perm to 4 perm, 1 perm to 5 perm, 1 perm, 5 perm, 5 perm to 20 perm, 5 perm to 15 perm, 5 perm to 10 perm, 8 perm, 8 perm to 10 perm, 8 perm to 9 perm, 9 perm, 10 perm, 10 perm to 20 perm, 10 perm to 15 perm, 15 per, 15 perm to 20 perm, or other, greater or lesser perm values as tested according to ASTM E96.

The protective layer 103 can also exhibit other properties such as tensile strength (e.g., to prevent tearing or ripping of the protective layer during handling or while being walked on), tackiness (e.g., to allow for easier handling of the building material and/or for walkability), and/or abrasiveness (e.g., to allow for ease in adhesion to other sublayers). In such embodiments, the protective layer 103 may be configured to have a coefficient of friction selected to provide walkability and durability of the protective layer so that workers can handle and walk on the protective layer without substantial damage thereto and without slippage.

For example, in embodiments, the protective layer can have a dry static coefficient of friction (CoF) greater than or equal to 0.5 and a dry dynamic CoF greater than or equal to 0.4 along an outer facing surface of the protective layer 103, as tested according to ASTM D1894. In embodiments, the protective layer can have a wet static coefficient of friction (CoF) greater than or equal to 0.5 and a wet dynamic CoF greater than or equal to 0.4 along an outer facing surface of the protective layer 103, as tested according to ASTM D1894. In some embodiments, the protective layer further can have a tack (adhesion) of between 25 oz./in to 60 oz./in, as measured according to ASTM 3330; and in embodiments, can have a tack of 25 oz./in to 55 oz./in, 25 oz./in to 50 oz./in, 25 oz./in to 45 oz./in, 25 oz./in to 40 oz./in, 25 oz./in to 35 oz./in, 25 oz./in to 30 oz./in, 30 oz./in to 60 oz./in, 30 oz./in to 50 oz./in, 30 oz./in to 40 oz./in, 35 oz./in to 60 oz./in, 35 oz./in to 55 oz./in, 35 oz./in to 50 oz./in, 35 oz./in to 45 oz./in, 35 oz./in to 40 oz./in, 40 oz./in to 60 oz./in, 40 oz./in to 55 oz./in, 40 oz./in to 50 oz./in, 40 oz./in to 45 oz./in, 45 oz./in to 60 oz./in, 45 oz./in to 55 oz./in, 45 oz./in to 50 oz./in, 50 oz./in to 60 oz./in, 50 oz./in to 55 oz./in, 55 oz./in to 60 oz./in, or other, greater or lesser tack values as measured according to ASTM 3330.

In embodiments, one or more of the sublayers of the protective layer 103 will be comprised of a polymeric material such as polyolefin, acrylic, thermoplastic, elastomer polyester, fiberglass, cellular foam, aerogel foam, foil materials, and/or fibrous woven or non-woven scrim material. In a further embodiment, one or more of the sublayers of the protective layer can comprise a coating, a woven fabric, or a non-woven spun bond fabric.

In an embodiment, the protective layer 103 can exhibit a peel strength of greater than or equal to approximately 1 lb/in, as tested according to ASTM D903. In embodiments, the protective layer 103 can exhibit a peel strength of 1 lb/in to 12 lb/in, 1 lb/in to 11 lb/in, 1 lb/in to 10 lb/in, 1 lb/in to 9 lb/in, 1 lb/in to 8 lb/in, 1 lb/in to 7 lb/in, 1 lb/in to 6 lb/in, 1 lb/in to 5 lb/in, 1 lb/in to 4 lb/in, 1 lb/in to 3 lb/in, 1 lb/in to 2 lb/in, 2 lb/in to 12 lb/in, 2 lb/in to 11 lb/in, 2 lb/in to 10 lb/in, 2 lb/in to 9 lb/in, 2 lb/in to 8 lb/in, 2 lb/in to 7 lb/in, 2 lb/in to 6 lb/in, 2 lb/in to 5 lb/in, 2 lb/in to 4 lb/in, 2 lb/in to 3 lb/in, 3 lb/in to 12 lb/in, 3 lb/in to 11 lb/in, 3 lb/in to 10 lb/in, 3 lb/in to 9 lb/in, 3 lb/in to 8 lb/in, 3 lb/in to 7 lb/in, 3 lb/in to 6 lb/in, 3 lb/in to 5 lb/in, 3 lb/in to 4 lb/in, 4 lb/in to 12 lb/in, 4 lb/in to 11 lb/in, 4 lb/in to 10 lb/in, 4 lb/in to 9 lb/in, 4 lb/in to 8 lb/in, 4 lb/in to 7 lb/in, 4 lb/in to 6 lb/in, 4 lb/in to 5 lb/in, 5 lb/in to 12 lb/in, 5 lb/in to 11 lb/in, 5 lb/in to 10 lb/in, 5 lb/in to 9 lb/in, 5 lb/in to 8 lb/in, 5 lb/in to 7 lb/in, 5 lb/in to 6 lb/in, 6 lb/in to 12 lb/in, 6 lb/in to 11 lb/in, 6 lb/in to 10 lb/in, 6 lb/in to 9 lb/in, 6 lb/in to 8 lb/in, 6 lb/in to 7 lb/in, 7 lb/in to 12 lb/in, 7 lb/in to 11 lb/in, 7 lb/in to 10 lb/in, 7 lb/in to 9 lb/in, 7 lb/in to 8 lb/in, 8 lb/in to 12 lb/in, 8 lb/in to 11 lb/in, 8 lb/in to 10 lb/in, 8 lb/in to 9 lb/in, 9 lb/in to 12 lb/in, 9 lb/in to 11 lb/in, 9 lb/in to 10 lb/in, 10 lb/in to 12 lb/in, 10 lb/in to 11 lb/in, 11 lb/in to 12 lb/in, 2 lb/in, 3 lb/in, 4 lb/in, 5 lb/in, 6 lb/in, 7 lb/in, 8 lb/in, 9 lb/in, 10 lb/in, 11 lb/in, 12 lb/in, or other, greater or lesser peel strengths as tested according to ASTM D903. Such a peel strength ensures that the protective layer 103 remains in place about the building material as a protective barrier against exposure to weather and potential damage from handling prior to and after installation of the package including the building material while being subjected to various external forces (e.g., handled and/or walked on).

As noted and as illustrated in FIG. 1D and FIG. 1E, in embodiments of the package 100 and 107, the protective layer 103 will fully encapsulate the core 106 of the building material, a portion of the building material 102, one or more of the layers of the building material, or overlap at least one side of the building material or the entire building material. For example, in embodiments, the protective layer 105 can completely or substantially encapsulate the polymeric sublayer 104 and the core 106, with the lower facing surface 116 of the core 106 exposed, and with an additional adhesive sublayer 108 applied to the lower facing surface 116 of the core 106. In other embodiments, the polymeric sublayer 104 and core 106 can be completely encapsulated and the adhesive sublayer 108 can be applied to or integrated with the outer sublayer 105.

As noted, the protective layer encapsulating the building material 102 as part of the package 100 or 107 will include at least one sublayer such as a polymeric sublayer 104. The polymeric sublayer 104 can be a film. For example, the polymeric sublayer 104 can be comprised of TPO or a polyethylene film. In other embodiments, the polymeric sublayer 104 can be comprised of a woven (e.g., a mesh, scrim or other woven layer) or non-woven layer. Such a layer can be comprised of woven fiberglass, polyester, or other suitable material. In embodiments, the polymeric sublayer 104 also can comprise a thermoplastic elastomeric or TPO underlayment material.

As noted, the building material 102 includes a core 106, having a body with an upper facing surface 114 and a lower facing surface 116. As noted, the polymeric sublayer 104 can be applied about the core 106, the adhesive sublayer 108 applied to the polymeric sublayer and at least the first and second surfaces of the core 106 to form the package 109. Other, different types of sublayers can be applied to the first and/or second surfaces of the core 116.

In embodiments, the core 106 can be comprised of an extrudate, laminate, cement based material, or some combination thereof. For example, in embodiments, the core 106 may be comprised of a laminated timber material, a laminated wood material, an extruded polymeric material, a cement based material, a foam, drywall, polyisocyanurate, as well as other materials suitable for use in roofing, flooring, walls, and/or other building applications, or a combination thereof. Additionally, in various non-limiting embodiments, the core 106 can include multi-layered materials, such as a laminated material or single layer materials that can include solid wood, polymer or other materials.

in various embodiments, the building material 102 further can comprise a building wall or a support beam, a roofing material such as decking or roofing panel, a flooring substrate, or other construction component. If the building material 102 is comprised of a flooring substrate, the flooring substrate may be a substrate panel for use as an underlayment for wood, laminate, tile, cement, or carpet. In such examples, the building materials 102 may comprise a core including an extrudate, one or more layers of pre-fabricated laminate wood, a cross-laminated timber, a cement based material, or combinations thereof. The building materials 102 also can include oriented strand boards (OSB) and/or structural insulated panels (SIP) that can be used for walls, to span across trusses of a roof, or between an eave and a ridge or peak on a roof.

Referring to FIG. 1F, the protective layer of the package 107 includes a plurality of sublayers, including at least one adhesive sublayer 108. The adhesive sublayer 108 can be applied to the lower facing surface 116 of the core 106 or to a lower facing surface of the second sublayer 104. A first surface 120, e.g., the surface opposite of a second surface 122 applied to the core 106, of the adhesive layer 108 can include or may be covered by a removable release layer 112, as illustrated in FIG. 1F. The removable release layer 112 will be applied to cover and protect the actual adhesive substance or film 110 of the adhesive sublayer 108, prior to installation of the building material, for example, during transportation and/or while handling the building material. The adhesive sublayer 108 can be comprised of a butyl, block copolymer, acrylic, polyolefin, and/or a combinations of adhesives, and in embodiments can comprise a water vapor permeable PSA.

In embodiments, the building material can be utilized for different applications. For example, the building material can be utilized for a roof deck, as flooring panels, as a structural support panel or beam, or as a wall panel. In other embodiments, the building material can be an exterior wood sheathing panel. Depending on the application, the building material can include multiple different layers and each of the layers can be disposed in the building material in varying positions or configurations. For example, in embodiments, the building material can include a laminated material having two layers, three layers, four layers, five layers, six layers, seven layers, up to eleven layers, or more. The layers can each provide different or additional functionality, such as fire resistance, additional support for the core 106, water resistance, and/or other performance characteristics or functionalities. As the building material is installed, rather than removing the protective layer 103, the protective layer 103 is configured to remain in place with the building material, being installed as part of the protected packaged building material, preventing waste and reducing installation time, and offering further protection from weather, workers walking on the building material, etc., to the building material after installation.

Figure 2:
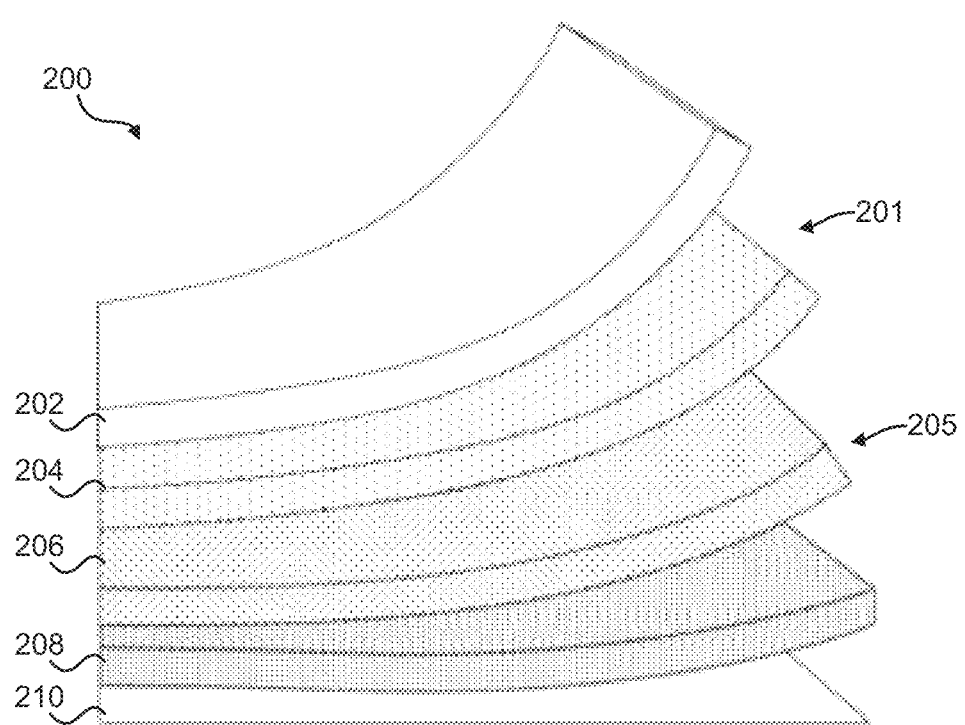
FIG. 2 is an elevational exploded view of one example embodiment of a package including a protective layer covering a building material according to principles of the present disclosure.

FIG. 2 is an elevational exploded view of another example embodiment of a package 200 encapsulating a building material 205 within a protective layer according to principles of the present disclosure. As noted, the building materials can be utilized for various purposes and, depending on the purpose, are structured, comprised, or configured in various configurations. The package 200, as illustrated in FIG. 2, includes a protective layer 201 configured to provide a protective barrier, e.g., to prevent water intrusion in a roof or roof deck. The protective layer 201, as shown, includes multiple sublayers. The first sublayer (e.g., the protective film sublayer 202) comprises a protective film. Similar to the polymeric sublayer 104 described above, the protective film sublayer 202 comprises a polymeric material and will cover or encapsulate the core 208 of the building material 205, and can extend past at least one edge of the other layers of the core 206 building material 209. In an example, another sublayer 210, e.g., a last or fourth sublayer 210, may be a part of the protective film sublayer 202. In another example, the fourth sublayer 210 may be separate from the protective film sublayer 202, but may be comprised of the same material, such as including a protective film and/or dual sided release film, and also may be removable such that prior to installation, the fifth sublayer 210 will be removed to expose adhesive sublayer 208 (e.g., a third sublayer). Such protective film sublayers 202 thus help prevent damage and/or other issues when the building material 205 is exposed to the elements, e.g., water, wind, heat, fire, etc.; and in embodiments, also may be comprised of various different materials, including polyolefin, acrylic, thermoplastic, elastomer, polyester, fiberglass, cellular foam, aerogel foam, or foil materials.

The protective layer of the package 200 also may include a sublayer formed from TPO, PE, or non-woven surface material, e.g., here shown as a second layer 204. In another embodiment, the second layer 204 may include a scrim, or mesh or other woven surface material. The building material of the package 200 further will include a core 206. The core 206 can include an extrudate or laminate, or a material such as wood, a cement based material, polyisocyanurate, or other material. As noted, the protective layer of the package 200 will include at least one adhesive sublayer 208. The adhesive sublayer 208 can be comprised of adhesives such as butyl, block copolymer, acrylic, polyolefin, or other, similar adhesives, and/or a combinations of adhesives, and in embodiments can comprise a water vapor permeable PSA.

Upon installation of the package 200 including the building material 205, other materials may be applied over the protective layer. For example, tile, wood or laminate flooring, shingles, carpet, siding, and/or other appropriate construction materials can be applied to the package 200 based on the intended use or design of building material 205. The resultant package 200, e.g., the protective packaged building material, can, after installation, provide a protective barrier that prevents water intrusion, prevents water absorption, and/or exhibits other characteristics described herein.

Figure 3:
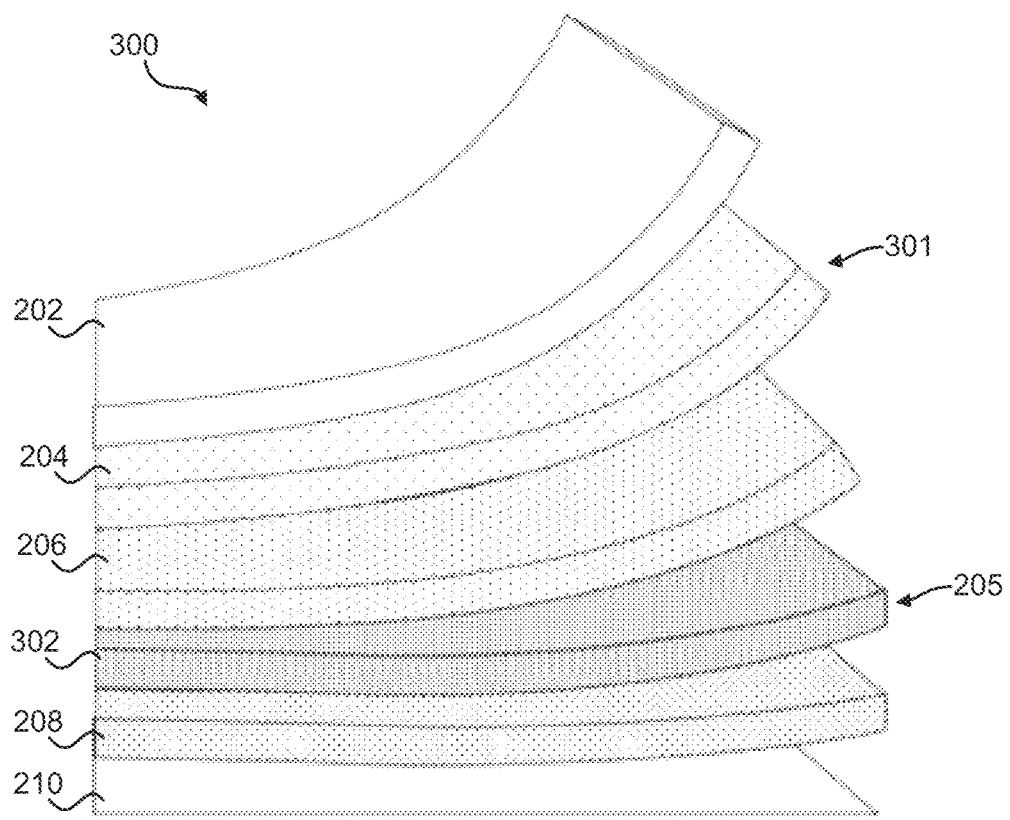
FIG. 3 is an elevational exploded view of one example embodiment of a package including a building material covered by a protective layer having multiple sublayers, including a vapor barrier sublayer according to principles of the present disclosure.

FIG. 3 is an elevational exploded view of one example embodiment of a package 300 including a protective layer 301 encapsulating a building material 205 having a core 206, the protective layer 301 including a vapor barrier sublayer. The protective layer 301 includes a plurality of sublayers, which can include one or more sublayers that are similar to the sublayers included in packages 100, 107, and/or 200 discussed above. For example, package 300 may include a first sublayer comprising a protective film sublayer 202, a TPO, PE, or non-woven surface sublayer 204 (e.g., a second sublayer), an adhesive sublayer 208, and a protective film/ dual sided release film sublayer 210. However, rather than the adhesive sublayer 208 being applied to the core 206, a foil sublayer 302 is disposed between the core 206 and the adhesive sublayer 208. The foil sublayer 302 ensures that vapor does not pass through the protective layer and into contact with the underlying building material of the package 300. The foil sublayer 302 can be applied to the lower facing surface of the core 206. A sublayer of an adhesive 208 also can be applied to the lower facing surface of the foil sublayer 302.

Figure 4:
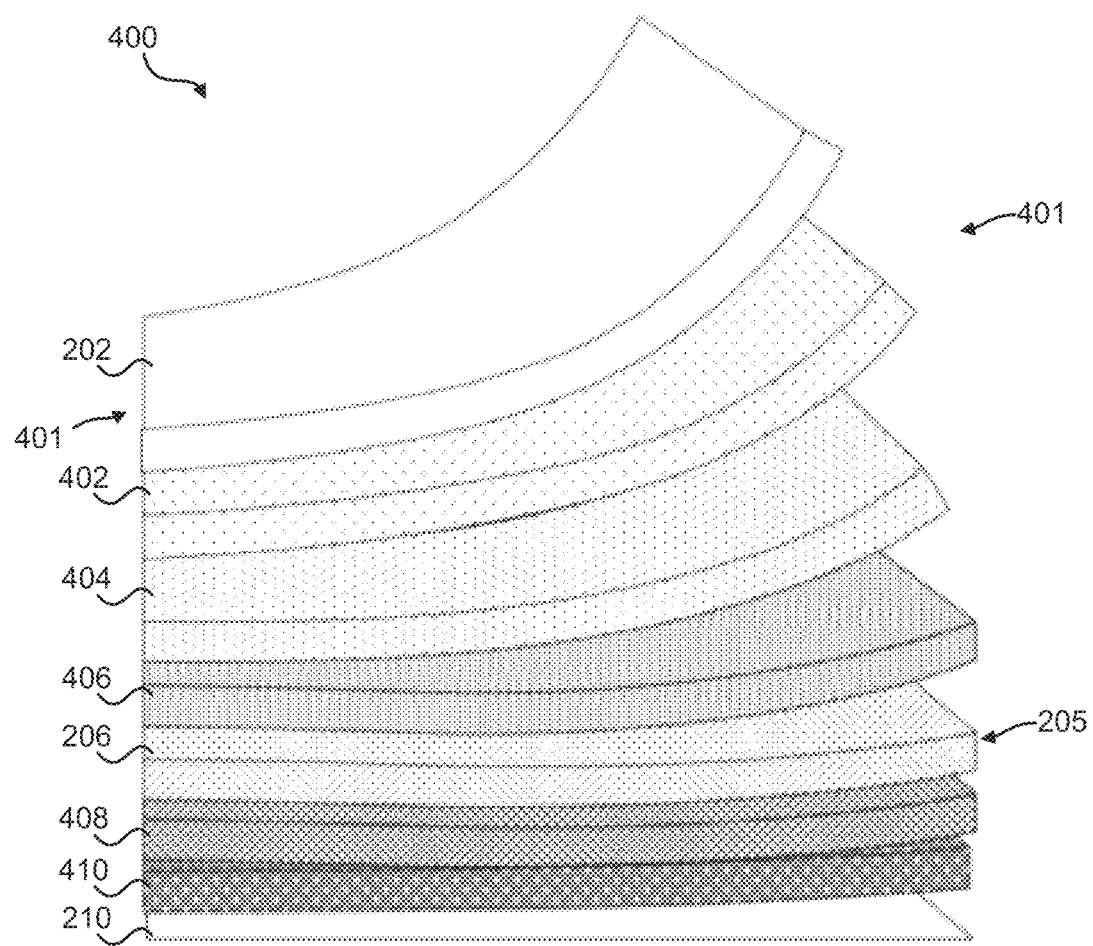
FIG. 4 is an elevational exploded view of another example embodiment of a package including a building material covered by a protective layer having multiple sublayers, including a breathable fire barrier according to principles of the present disclosure.

FIG. 4 is an elevational exploded view of one example embodiment of a package 400 for a building material 205 having a core 206, and with a protective layer 401 encapsulating the building material and including a breathable fire layer according to principles of the present disclosure. The building material 205 can be composed of a material configured to withstand high heat, exhibit higher than normal or typical fire resistance, withstand fire for at least a period of time, prevent fire damage from fire exposure (e.g., if one side of the package 400 is exposed to fire, any objects or structures on the other side is not damaged from the fire), and/or withstand high temperatures. The protective layer 401 of the package 400 also can include several sublayers including materials that are fire retardant, fire resistant, heat resistant, and/or breathable. For example, heat resistant or thermally insulating sublayers including or comprising a foam (e.g., Polyisocyanurate), Expanded Polystyrene (EPS), polyolefin, or aerogel), a nano-cellular material, or other suitable heat resistant or insulating materials, can be used. Such a breathable fire barrier building material 400 can cover or wrap structural supports and/or panels of a structure.

The protective layer 401 of the package 400 can include a plurality of sublayers, including, in embodiments, a protective film sublayer 202 (e.g., a first layer) and protective film/dual sided release film 210 (e.g., a seventh sublayer), similar to the package 200 of FIG. 2 and the package and 300 of FIG. 3. The protective layer 401 (FIG. 4) of the package 400 further can include a waterproofing sublayer 402, e.g., a second sublayer, a breathable fire resistant sublayer 404, e.g., a third sublayer, applied to the lower facing side of the waterproofing sublayer 402. The breathable fire resistant sublayer 404 also can be applied to an upper facing side of a reinforcement or carrier sublayer 406, e.g., a fourth sublayer applied to an upper facing side of the extrusion core 206, and a breathable foil 408, e.g., a fifth layer, can be applied to the lower facing side of the core 206 of the building material 205. A breathable peel and stick adhesive 410, e.g., a sixth sublayer further can be applied to a lower facing side of the breathable foil sublayer 408, with the protective film/dual sided release film sublayer 210 applied thereafter.

The breathable fire resistant sublayer 404 also can be applied to the upper facing side of the reinforcement or carrier sublayer 406 as a coating or as another material, and, in embodiments can be comprised of an intumescent coating, a fire resistant additive, a foil (e.g., aluminum), or other suitable fire resistant material. Such a breathable material can be perforated, e.g., perforated aluminum. Other breathable layers (e.g., breathable fire resistant layer 404, and any other breathable layer described herein) can be comprised of cavitated polyolefin, breathable polymers, or other perforated materials.

In embodiments, the protective layer 401 of the package 400 can include various other layers based on the use of the building material 205. Each layer can vary in thickness as well, also based on potential use or property to be exhibited. For example, the reinforcement or carrier sublayer 406 and/or the core 206 of the building material can be thicker for some uses, such as roofing applications, to support the weight of installers as the building materials are installed and as one or more people walk on the building materials.

In embodiments, the protective film/dual sided release film or protective film sublayer 202 may vary in thickness depending on the use case. For example, the protective film/dual sided release film or the protective film sublayer may be approximately 1 mil to 60 mil; and in embodiments, from 1 mil to 55 mil, 1 mil to 50 mil, 1 mil to 45 mil, 1 mil to 40 mil, 1 mil to 35 mil, 1 mil to 30 mil, 1 mil to 25 mil, 1 mil to 20 mil, 1 mil to 15 mil, 1 mil to 10 mil, 1 mil to 5 mil, 5 mil to 10 mil, 5 mil to 15 mil, 5 mil to 20 mil, 5 mil to 25 mil, 5 mil to 30 mil, 5 mil to 35 mil, 5 mil to 40 mil, 5 mil to 45 mil, 5 mil to 50 mil, 5 mil to 55 mil, 5 mil to 60 mil, 10 mil to 10 mil, 10 mil to 30 mil, 10 mil to 40 mil, 10 mil to 50 mil, 10 mil to 60 mil, 20 mil to 30 mil, 20 mil to 409 mil, 20 mil to 50 mil, 20 mil to 60 mil, 30 mil to 40 mil, 30 mil to 50 mil, 30 mil to 60 mil, 40 mil to 50 mil, 40 mil to 60 mil, and 50 mil to 60 mil. Other thicknesses also can be provided.

In addition, in embodiments, the thickness can vary depending on end use, exposure to environmental conditions such as UV light, rain, temperature variations, handling, etc. For example, and without limitation, in embodiments such as where the building material is to be utilized for flooring applications, the protective film sublayer 202 may be between 50 mils to 100 mils thick, 50 mils to 90 mils, 50 mils to 80 mils, 50 mils to 70 mils, 50 mils to 60 mils, 60 mils to 100 mils, 60 mils to 90 mils, 60 mils to 80 mils, 60 mils to 70 mils, 70 mils to 100 mils, 70 mils to 90 mils, 70 mils to 80 mils, 80 mils to 100 mils, or 80 to 90 mils (and further can have greater or lesser thicknesses depending on use), to increase tensile strength and prevent tearing of the protective film sublayer 202 as the package 400 is walked on.

In another example, the protective film sublayer 202 may be thicker due to potential long-term exposure to UV light, end use of the building material, potential traffic (e.g. people walking on the building material), outdoor weather conditions or combinations thereof. In yet another example, the protective film sublayer 202 may be thinner, for example, if the desired property of the protective film sublayer 202 is to prevent water absorption.

As described herein, the type and amount of layers of the building material 400 also can vary depending on the application or uses thereof. For example, a layer configured for nail sealability may be utilized for roofing applications or other applications where nails or screws are utilized, the sealing layer comprised of a material to form a seal around a nail or screw.

As discussed, in embodiments, the building materials 102 or 205, or any other building materials described herein, may be utilized as a roofing panel, flooring material, wall or other construction component. One or more sublayers, such as the protective film sublayer 202 of the protective layer, may overlap the edges of the building materials, e.g., a roofing panel. As the building materials are installed, the protective layer of a building material may abut or be arranged adjacent the protective layer of another building material. To ensure a water proof or water resistant structure, the building materials will be sealed, such as with a seam tape or other materials. The building materials in such applications can be larger, e.g., 12 feet by 60 feet, or smaller 4 feet by 8 feet. The building material can be constructed at other varying sizes.

Figure 5:
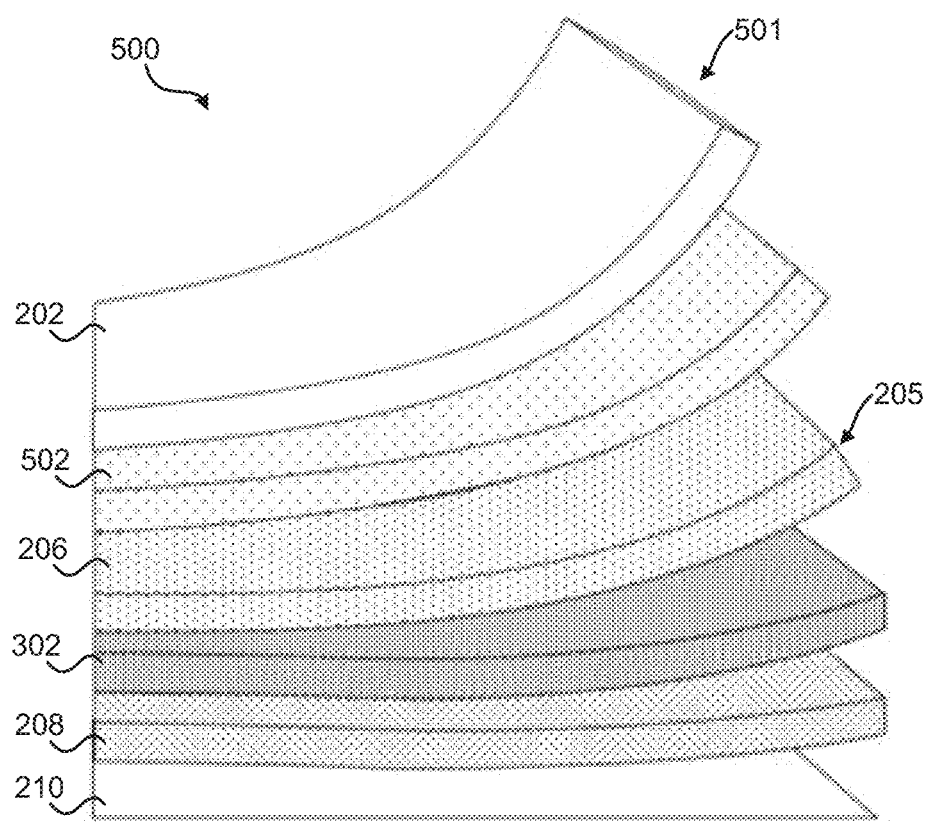
FIG. 5 is an elevational exploded view of another example embodiment of a package including a building material covered by a protective layer having multiple sublayers according to principles of the present disclosure.

FIG. 5 is an elevational exploded view of one example embodiment of a package 500 for a building material such as a tile/cement backer according to principles of the present disclosure. The package 500 can be configured to assist in installation of flooring, while also providing a water barrier and/or fire or heat resistance. In embodiments, an installer can adhere or apply the package 500 to a section of a building sub-floor and then continue to apply other packages 500 adjacent to the first package 500, until the sub-floor or substrate is covered and ready for installation of wooden flooring, tile, carpet, or other type of flooring. It will be understood, that while the package 500 can be utilized as a tile/cement backer, the package 500 may be utilized in other construction applications. In embodiments, an adhesive (e.g., adhesive or adhesive layer 208), can be used while in other embodiments fasteners or other connections can be utilized to ensure the building materials are secured to a sub-floor or substrate.

Similar to the packages 200, 300, and 400, the package 500 may include a protective layer 501 having a plurality of sublayers, including a protective film sublayer 202 and protective film/dual sided release film sublayer 210. The building material of the package 500 will include a core 206, such as discussed above, and the protective layer further can include a foil sublayer 302, and an adhesive sublayer 208. In this embodiment, rather than a TPO, PE, or non-woven sublayer 204, the package 500 may include a scrim non-woven sublayer 502 configured for a tile/cement application.

Figure 6:
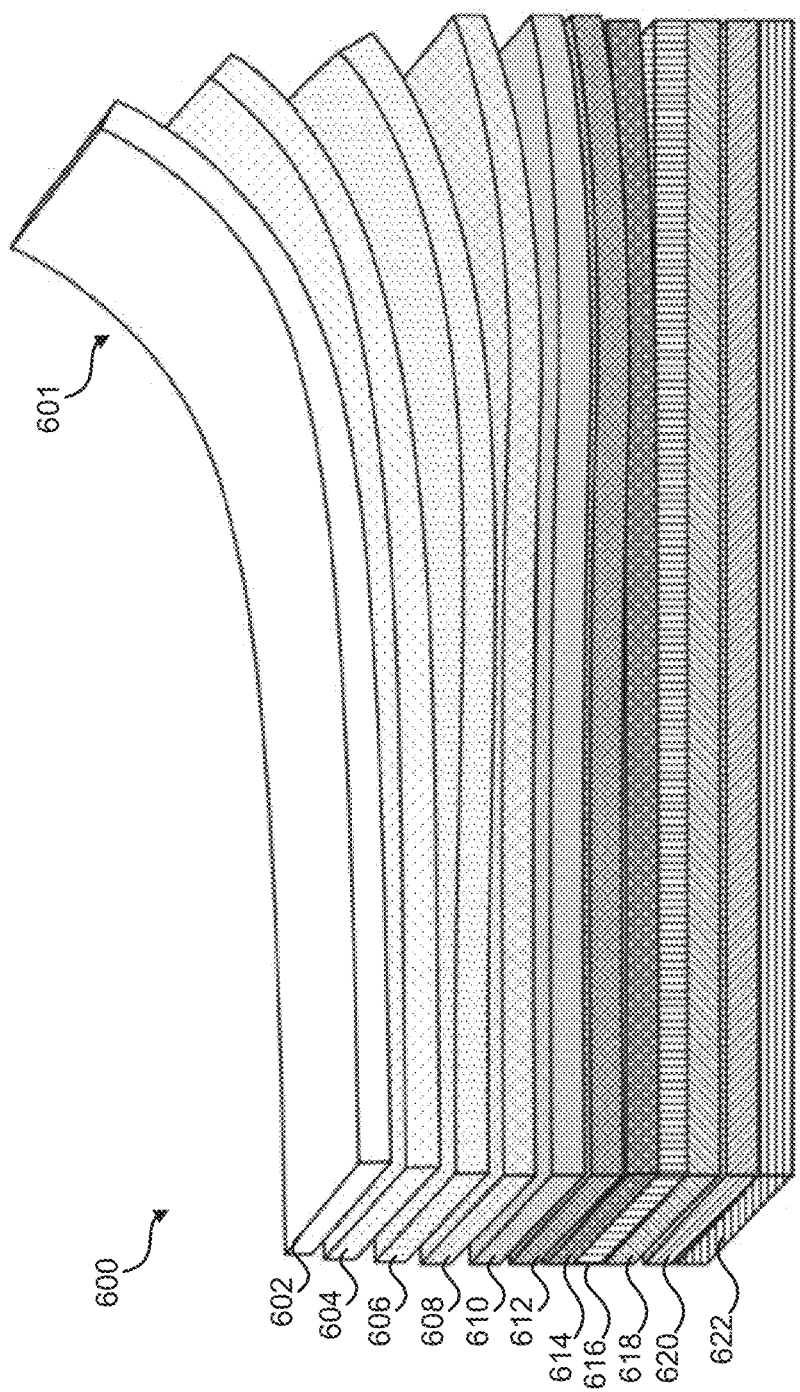
FIG. 6 is an elevational exploded view of still another example embodiment of a package including a protective layer having multiple stacked sublayers covering a building material according to principles of the present disclosure.

FIG. 6 is an elevational exploded view of one example embodiment of a multi-layer package 600, here shown in a non-limiting example, as an eleven-layer package 600 according to principles of the present disclosure. The package 600 will have a protective layer covering a building material, which protective layer may include plurality of sublayers, e.g., here shown in a non-limiting example as having a first layer 602, a second layer 604, a third layer 606, a fourth layer 608, a fifth layer 610, a sixth layer 612, a seventh layer 614, an eighth layer 616, a ninth layer 618, a tenth layer 620, and an eleventh layer 622. One or more of such sublayers may combined to form the protective layer 601. The sublayers further include one or more of a water resistant sublayer, a fire resistant sublayer, a polymeric sublayer, a protective barrier, a core sublayer, and other types of sublayers selected to provide various properties of functional characteristics such as UV protection, etc., and/or some combinations thereof.

Each sublayer may be produced in different manners or methods. A sublayer may be extruded, adhered to another sublayer, co-extruded with another sublayer, infused with another sublayer, coated on another sublayer, attached with an adhesive material, thermally bonded or welded to another sublayer, discontinuously coated onto another sublayer, liquid coated onto another sublayer, or sprayed onto another onto another sublayer. Each sublayer may be formed based on the type of material and purpose of the sublayer, e.g., a fire resistant sublayer may be adhered to another sublayer. The package 600 may be formed in such a way that each building material may connect or interface with an adjacent building material. Further, in FIG. 6 or in any other embodiment described herein, an adhesive or adhesive sublayer may be applied or disposed between each sublayer to attach a sublayer above to a sublayer below.

In embodiments, the package 600 may be manufactured to a size that may be easy or reasonable to handle, e.g., a size allowing for one or more installers to carry and install a package 600. The order of the sublayers may be altered or changed based on application, e.g., roofing, flooring, walls, and so on. The overall thickness of the package 600 may also vary based on application. Finally, the building material eliminates waste by reducing or eliminating the amount of packaging for such building materials, as well as reducing or eliminating the amount of removable portions (e.g., potentially including one removable releasable film to protect an adhesive).

The foregoing description generally illustrates and describes various embodiments of building materials, including building materials for forming a water barrier, vapor barrier, breathable fire barrier, tile/cement backer for roofing, wall, floor, or other structural applications according to the principles of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense.

Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure.

The invention claimed is:

1. A package comprising:
   a plurality of building materials;
      wherein each of the plurality of building materials comprises:
         a core of a laminate or extrudate,
         wherein the core has a first surface and a second surface; and
   a plurality of protective layers;
      wherein each of the plurality of protective layers comprises:
         a polymeric sublayer and an adhesive sublayer;
         wherein the polymeric sublayer comprises a film configured to encapsulate the core of each of the plurality of building materials, and includes at least one overlap portion that projects past at least one side edge of the core;
         wherein the adhesive sublayer of each of the plurality of protective layers is in contact with the first surface of the core of each of the plurality of building materials;
         wherein a peel strength of each of the plurality of protective layers in contact with the core of each of the plurality of building materials is 1 lb/in to 12 lb/in when tested according to ASTM D903, wherein each of the plurality of protective layers is configured to remain in place after each of the plurality of building materials is installed in a building structure.

2. The package of claim 1, wherein at least some of the plurality of building materials comprise roofing panels.

3. The package of claim 2, wherein the polymeric sublayer comprises a thermoplastic polyolefin membrane.

4. The package of claim 1, wherein at least some of the plurality of building materials comprise flooring panels.

5. The package of claim 1, wherein the core of each of the plurality of building materials comprises a pre-fabricated laminate wood, a cross-laminated timber, or combination thereof.

6. The package of claim 1, wherein the polymeric sublayer comprises a film comprising polyolefin, acrylic, thermoplastic, elastomer, polyester, cellular foam, aerogel foam, or a combination thereof.

7. The package of claim 1, wherein the polymeric sublayer comprises a film having at least one property including fire resistance, insulation, impact resistance, breathability, ultraviolet resistance, water resistance, sound dampening, or combinations thereof.

8. The package of claim 1, wherein at least some of the plurality of building materials comprise a tile or cement backing panel.

9. The package of claim 1, wherein at least some of the plurality of building materials comprise a structural support, and wherein the protective layer further comprises a vapor permeable film material.

10. A package, comprising:
a plurality of building materials, each including a core having a plurality of side edges, a first surface, and a second surface;
a plurality of protective layers applied over the core of each of the plurality of building materials, each of the plurality of protective layers comprising a plurality of sublayers, including:
at least one polymeric sublayer; and
at least one adhesive sublayer;
wherein the at least one polymeric sublayer comprises a film configured to encapsulate the core of each of the plurality of building materials, and includes at least one overlap portion that projects past at least one side edge of the core;
wherein the at least one adhesive sublayer of each of the plurality of protective layers is in contact with the first surface of the core of each of the plurality of building materials;
wherein each of the plurality of protective layers is configured to remain in place after installation of each of the plurality of building materials in a building structure; and
wherein a peel strength of each of the plurality of protective layers in contact with the core of each of the plurality of building materials is 1 lb/in to 12 lb/in when tested according to ASTM D903.

11. The package of claim 10, wherein each of the plurality of building materials comprise at least one of a roof deck panel, flooring panel, wall panel, and a structural support.

12. The package of claim 10, wherein the core comprises a cross-laminated timber material, a laminated wood material, an extruded polymeric material, a cement-based material, or combinations thereof.

13. The package of claim 10, wherein the at least one polymeric sublayer comprises a thermoplastic polymer membrane.

14. The package of claim 10, wherein the at least one polymeric sublayer comprises a film having at least one property including fire resistance, insulation, impact resistance, breathability, ultraviolet resistance, water resistance, sound dampening, or combinations thereof.

15. The package of claim 10, wherein the polymeric sublayer comprises a polyolefin, acrylic, thermoplastic, elastomer, polyester, cellular foam, aerogel foam, or a combination thereof.

16. The package of claim 10, wherein each of the plurality of protective layers further comprises a fire resistant coating, a sound damping coating, a smart coating of an adaptive vapor control material, or combination thereof.

17. A roofing system, comprising:
a substrate;
a plurality of building materials positioned on the substrate;
wherein each of the plurality of building materials comprises:
a core comprising a laminate or extrudate and having a first surface and a second surface; and
a plurality of protective layers applied to the plurality of building materials;
wherein each of the plurality of protective layers comprises:
a polymeric sublayer; and
an adhesive sublayer;
wherein the polymeric sublayer comprises a film configured to encapsulate the core of each of the plurality of building materials, and includes at least one overlap portion that projects past at least one side edge of the core;
wherein the adhesive sublayer of each of the plurality of protective layers is in contact with the first surface of the core of each of the plurality of building materials;
wherein a peel strength of each of the plurality of protective layers on the core of each of the plurality of building materials is 1 lb/in to 12 lb/in when tested according to ASTM D903; and
wherein each of the plurality of protective layers is configured to remain in place after each of the plurality of building materials are installed on the substrate to form a roof.

18. The roofing system of claim 17, wherein each of the plurality of protective layers further comprises a plurality of polymeric sublayers, each of the plurality of polymeric sublayers having at least one property including fire resistance, insulation, impact resistance, breathability, ultraviolet resistance, water resistance, sound dampening, or combinations thereof.

19. The roofing system of claim 17, wherein each of the plurality of protective layers further comprises a fire resistant coating, a sound damping coating, a smart coating of an adaptive vapor control material, or combination thereof.

20. A package comprising:
a plurality of building materials;
wherein each of the plurality of building materials comprises:
a core of a laminate or extrudate,
wherein the core has a first surface and a second surface; and
a plurality of protective layers;
wherein each of the plurality of protective layers comprises:
a polymeric sublayer and an adhesive sublayer;

wherein the adhesive sublayer of each of the plurality of protective layers is in contact with the first surface of the core of each of the plurality of building materials;

wherein at least one protective layer of the plurality of protective layers comprises a vapor permeable film material;

wherein a peel strength of each of the plurality of protective layers in contact with the core of each of the plurality of building materials is 1 lb/in to 12 lb/in when tested according to ASTM D903, wherein each of the plurality of protective layers is configured to remain in place after each of the plurality of building materials is installed in a building structure.

21. The package of claim 20, wherein at least some of the plurality of building materials comprise a structural support.

* * * * *